United States Patent
Zhang et al.

(10) Patent No.: US 11,394,318 B2
(45) Date of Patent: Jul. 19, 2022

(54) POWER MANAGEMENT CIRCUIT AND POWER MANAGEMENT METHOD FOR TRIBOELECTRIC NANOGENERATOR, AND ENERGY SYSTEM

(71) Applicant: Beijing Institute of Nanoenergy and Nanosystems, Beijing (CN)

(72) Inventors: Chi Zhang, Beijing (CN); Wei Li, Beijing (CN); Zhonglin Wang, Beijing (CN); Fengben Xi, Beijing (CN); Yaokun Pang, Beijing (CN)

(73) Assignee: BEIJING INSTITUTE OF NANOENERGY AND NANOSYSTEMS, Beijing (CN)

( * ) Notice: Subject to any disclaimer, the term of this patent is extended or adjusted under 35 U.S.C. 154(b) by 220 days.

(21) Appl. No.: 16/612,655

(22) PCT Filed: May 11, 2018

(86) PCT No.: PCT/CN2018/086498
§ 371 (c)(1),
(2) Date: Nov. 11, 2019

(87) PCT Pub. No.: WO2018/205994
PCT Pub. Date: Nov. 15, 2018

(65) Prior Publication Data
US 2020/0099316 A1 Mar. 26, 2020

(30) Foreign Application Priority Data
May 12, 2017 (CN) .......................... 201710340738.6

(51) Int. Cl.
*H02N 1/04* (2006.01)
*H02M 7/217* (2006.01)
(Continued)

(52) U.S. Cl.
CPC ............ *H02N 1/04* (2013.01); *H02M 7/2176* (2013.01); *H02M 3/155* (2013.01); *H02M 7/06* (2013.01)

(58) Field of Classification Search
CPC ...... H02M 7/2176; H02M 7/06; H02M 3/155; H02N 1/04
See application file for complete search history.

(56) References Cited

U.S. PATENT DOCUMENTS 7,105,982 B1    9/2006   Hagood et al.
9,876,384 B2    1/2018   Liu
(Continued)

FOREIGN PATENT DOCUMENTS

CN          1610210 A     4/2005
CN       104076378 A    10/2014
(Continued)

OTHER PUBLICATIONS

International Search Report and Written Opinion of the International Searching Authority, International Application No. PCT/CN2018/086498, dated Jul. 31, 2018, 10 pp.
(Continued)

*Primary Examiner* — Jue Zhang
(74) *Attorney, Agent, or Firm* — Myers Bigel, P.A.

(57) ABSTRACT

The present disclosure provides a power management module, a power management method and an energy system for a triboelectric nanogenerator. The power management module is configured to be electrically connected to a back end of the triboelectric nanogenerator, the power management module includes a rectifying circuit and a Direct Current (DC) buck circuit. The rectifying circuit is electrically connected to the back end of the triboelectric nanogenerator for rectifying a signal generated by the triboelectric nanogenerator to output a first DC signal, and the DC buck circuit
(Continued)

is electrically connected to a back end of the rectifying circuit for decreasing a voltage of the first DC signal to output a second DC signal. The power management module may maximize and autonomously release the energy of the triboelectric nanogenerator, and perform a buck conversion for charging the energy storage device or directly driving the electronic device.

9 Claims, 4 Drawing Sheets

(51) Int. Cl.
*H02M 7/06* (2006.01)
*H02M 3/155* (2006.01)

(56) References Cited

U.S. PATENT DOCUMENTS

| | | | |
|---|---|---|---|
| 2016/0172898 A1* | 6/2016 | Willemin | H03K 3/021 |
| | | | 320/101 |
| 2017/0236990 A1* | 8/2017 | Park | H02N 2/18 |
| | | | 310/306 |

FOREIGN PATENT DOCUMENTS

| | | |
|---|---|---|
| CN | 107508488 A | 12/2017 |
| EP | 2 933 912 A1 | 10/2015 |
| JP | 2013523080 A | 6/2013 |
| KR | 20160009058 A | 1/2016 |
| WO | 2016/096492 A1 | 6/2016 |
| WO | 2017067446 A1 | 4/2017 |

OTHER PUBLICATIONS

Xi et al., "Universal power management strategy for triboelectric nanogenerator", Nano Energy, vol. 37, Jul. 2017, pp. 168-176.
"Notification of Reason for Refusal and English language translation", KR Application No. 10-2019-7034196, dated May 20, 2021, 10 pp.
Extended European Search Report corresponding to European Patent Application No. 18799384.5 (9 pages) (dated Nov. 24, 2020).
Notice of Reasons for Refusal corresponding to Japanese Patent Application No. 2019-562272 (6 pages) (dated Oct. 21, 2020).
Malte, John, et al., "Small signal impedance measurement in droop controlled AC microgrids", 2014 IEEE Energy Conversion Congress and Exposition (ECCE), IEEE, pp. 702-709 (2014).
Solsona, Jorge, et al., "Control of step-down DC-DC power converter with LCL output filter feeding a constant power load", 2016 IEEE Conference on Control Applications (CCA), IEEE, pp. 267-272 (2016).

* cited by examiner

POWER MANAGEMENT CIRCUIT AND POWER MANAGEMENT METHOD FOR TRIBOELECTRIC NANOGENERATOR, AND ENERGY SYSTEM

CROSS REFERENCE

The disclosure claims the benefit of the Chinese Patent Application No. 201710340738.6, entitled "power management circuit and power management method for triboelectric nanogenerator, and energy system", filed on May 12, 2017, and the PCT application No. PCT/CN2018/086498, entitled "power management circuit and power management method for triboelectric nanogenerator, and energy system", filed on May 11, 2018, which are hereby incorporated herein by reference.

TECHNICAL FIELD

The present disclosure relates to the field of circuit management, and in particular, to a power management module of a triboelectric nanogenerator, an energy system including the power management module, and a power management method and a tribotronic energy extractor for a triboelectric nanogenerator.

BACKGROUND

Triboelectric nanogenerators have shown great advantages and application potentials in collection of human kinetic energy and environmental mechanical energy. IDTechEx's research report predicts that the market for tribotronic energy collection in the sensor field will reach 400 million US dollars in 2027, which is a new energy technology with broad market prospects. At present, the triboelectric nanogenerators have reached an output power of 500 W/m$^2$, which may meet the application requirements of many low-power consumed systems in terms of indexes. However, due to limitation of high output impedance of triboelectric nanogenerator, it has quiet low direct charging efficiency for charging energy storage devices and cannot supply energy to electronic device, which causes it not applicable in daily household electrical appliances. The power management is the bottleneck for promotion and practical application of triboelectic nanogenerator. Only if the random mechanical energy is converted to continuous and stable electrical energy, the output can satisfy the working requirement of commercial electronic device, which enables the practical application of triboelectric nano-generator in production and daily life.

Currently, there is no power management module based on the triboelectric nanogenerator and the power management method of triboelectric nanogenerator, and there are few researches. For the mechanical switch-based power management module, the design of the system structure is very complicated due to the limited number of switches and the limited voltage conversion ratio. For the traditional transformer-based power management module, it is only applicable to the high frequency AC signal transformation situation, and its transformer's volume and quality are large. For the internally powered electronic switch-based power management module, it has a larger circuit volume and a larger internal leakage current, requires pre-stored power for its operation, and the circuit efficiency is limited.

Therefore, it is desired for a universal, high-efficiency and practical power management module for the triboelectric nanogenerator so that the triboelectric nanogenerator is applicable in the micro-energy field.

SUMMARY

In view of this, an object of the present disclosure is to provide a power management module and an energy collection management system for a triboelectric nanogenerator to address at least one of the technical problems as described above.

According to an aspect of the present disclosure, a power management module for a triboelectric nanogenerator is provided, which is configured to be electrically connected to a back end of the triboelectric nanogenerator, the power management module including a rectifying circuit and a Direct Current (DC) buck circuit, wherein the rectifying circuit is electrically connected to the back end of the triboelectric nanogenerator for rectifying a signal generated by the triboelectric nanogenerator to output a first DC signal; and the DC buck circuit is electrically connected to a back end of the rectifying circuit for decreasing a voltage of the first DC signal to output a second DC signal.

Further, the rectifying circuit includes a first output terminal and a second output terminal; the DC buck circuit includes an LC circuit and a switch circuit, wherein the first output terminal is connected to one terminal of the LC circuit via the switch circuit, and the second output terminal is connected to the other terminal of the LC circuit; and both terminals of a capacitor C in the LC circuit are configured as voltage output terminals of the power management module for outputting the second DC signal.

Further, the DC buck circuit further includes a freewheeling diode connected across the LC circuit for forming a loop with the LC circuit when the switch circuit is disconnected, to release energy of an inductor L in the LC circuit through the loop.

Further, the switch circuit is an autonomous switch, including a voltage comparator and a field effect transistor, wherein the voltage comparator has input terminals respectively connected to the first output terminal and the second output terminal, and an output terminal connected to a gate of the field effect transistor; and the gate of the field effect transistor acts as a control electrode, one of a drain and a source of the field effect transistor is connected to the first output terminal as an input electrode; and the other of the drain and the source is connected to one of the terminals of the LC circuit as an output electrode.

Further, the voltage comparator is power supplied by the triboelectric nanogenerator.

Further, an inductance of the inductor L in the LC circuit is 1-10 mH.

Further, a capacitance of the capacitor C in the LC circuit is 1-20 μF.

Further, the rectifying circuit is a full-wave bridge rectifier.

According to another aspect of the present disclosure, a power management method for a triboelectric nanogenerator is provided, including:

rectifying an Alternating Current (AC) signal generated by the triboelectric nanogenerator to output a first Direct Current (DC) signal;

comparing a voltage of the first DC signal with a reference voltage, wherein when the voltage of the first DC signal is higher than the reference voltage, energy generated by the triboelectric nanogenerator is released to an LC circuit, and is subjected to DC buck conversion in the LC circuit, which outputs a second DC signal on a load; and when the voltage of the first DC signal is lower than the reference voltage, the LC circuit outputs a second DC signal on the load through a freewheeling circuit.

Further, the reference voltage is a maximum voltage output from the triboelectric nanogenerator.

According to yet another aspect of the present disclosure, an energy system is provided, which includes a triboelectric nanogenerator and the power management module as described above, wherein the power management module is electrically connected to the back end of the triboelectric nanogenerator, and the second DC signal is used as an output of the energy system to charge an energy storage device or directly drive an electronic device.

According to still another aspect of the present disclosure, a triboelectric energy extractor for a triboelectric nanogenerator is provided, which includes: a rectifying circuit and a switch circuit, wherein the rectifying circuit is electrically connected to a back end of the triboelectric nanogenerator for rectifying a signal generated by the triboelectric nanogenerator;

the switch circuit includes a voltage comparator and a field effect transistor, wherein the voltage comparator has input terminals respectively connected to output terminals of the rectifying circuit, and an output terminal connected to a gate of the field effect transistor; and one of a drain and a source of the field effect transistor is connected to a first output terminal of the rectifying circuit, and the other of the drain and the source is one output terminal of the switch circuit, and a second output terminal of the rectifying circuit is another output terminal of the switch circuit.

The present disclosure has the following characteristics.

The triboelectric energy extractor including the rectifying circuit and the switch circuit is proposed based on the energy maximization transfer principle of the triboelectric nanogenerator and the autonomous electronic switch; and the power management module for the triboelectric nanogenerator is proposed which includes the DC buck circuit.

The module may maximize and autonomously release the energy of the triboelectric nanogenerator, and obtain a continuous and stable power supply on the load by the DC buck conversion.

The module may implement power management for various triboelectric nanogenerators, and may be used for the collection of the human kinetic energy and the environmental mechanical energy. The module has versatility, efficiency and usability, and may provide micro-energy solutions for the application fields such as the wearable electronic device and the industrial distributed measurement and control wireless networking etc.

DETAILED DESCRIPTION

In order to illustrate the objects, technical solutions and advantages of the present disclosure more clearly, the present disclosure will be further described in detail below with reference to the specific embodiments in connection with the drawings. The description of the embodiments of the present disclosure is intended to be illustrative of the general inventive concepts of the present disclosure, but should not be construed as limiting the scope of the present disclosure.

According to the basic idea of the present disclosure, a power management module for a triboelectric nanogenerator is provided, which realizes a regulated DC output and an output impedance conversion through a rectifying circuit and a DC buck circuit, thereby solving the problems that it cannot directly supply power to the electronic device and it has the low charging efficiency of charging the energy storage device.

Figure 1:
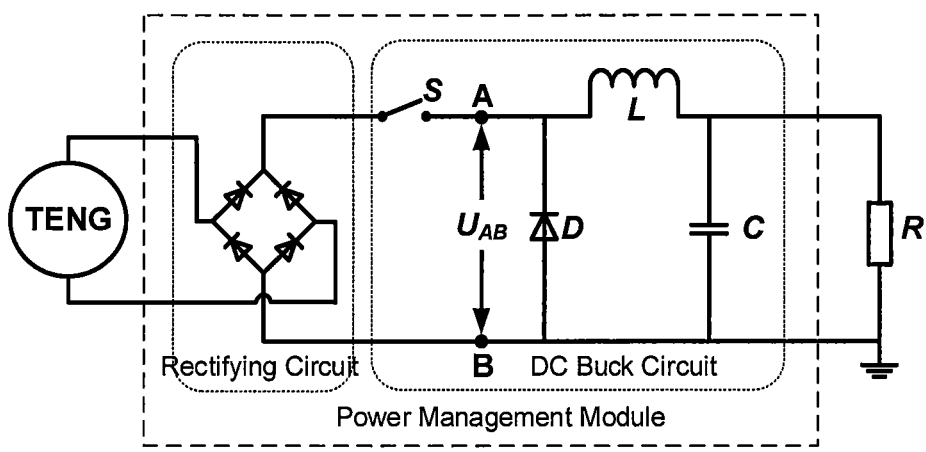
FIG. 1 is a circuit schematic diagram of a power management module for a triboelectric nanogenerator according to an embodiment of the present disclosure.

FIG. 1 is a circuit schematic diagram of a power management module for a triboelectric nanogenerator according to an embodiment of the present disclosure. As shown in FIG. 1, according to an aspect of an embodiment of the present disclosure, a management module for a triboelectric nanogenerator is provided, including a rectifying circuit and a DC buck circuit, wherein the rectifying circuit is electrically connected to the back end of the triboelectric nanogenerator (TENG) for rectifying a signal generated by the triboelectric nanogenerator to output a first DC signal; and the DC buck circuit is electrically connected to the back end of the rectifying circuit for decreasing a voltage of the first DC signal to output a second DC signal.

The DC buck circuit may include a switch circuit S, a freewheeling diode D, and an LC circuit (including an inductor L and a capacitor C).

The rectifying circuit is configured to rectify an AC signal generated by the triboelectric nanogenerator into a DC signal, and includes a first output terminal and a second output terminal, a voltage across the first output terminal and the second output terminal voltage being $U_{AB}$. The first output terminal is connected to one terminal of the LC circuit via the switch circuit, and the second output terminal is connected to the other terminal of the LC circuit. The freewheeling diode D is connected across the LC circuit for forming a loop with the LC circuit when the switch circuit is switched off, to release energy of the inductor L in the LC circuit through the loop. Both terminals of the capacitor C in the LC circuit are configured as voltage output terminals of the power management module for outputting the second DC signal. The rectifying circuit may be a full-wave bridge rectifier.

This circuit may be considered as coupling the triboelectric nanogenerator to the DC buck circuit. The bridge rectifier converts the AC signal generated by the triboelectric nanogenerator into the first DC signal. The switch circuit S not only has an effect of controlling accumulation and release of the energy of the triboelectric nanogenerator, but also has a switching effect to the DC buck circuit. The freewheeling diode D is in an off state when the switch circuit S is switched on, and the triboelectric nanogenerator transfers energy to the back-end LC circuit. The freewheeling diode D is in a freewheeling state when the switch circuit S is switched off, thus a loop is provided for releasing energy of the inductor. The inductor L and the capacitor C form a low-pass filter that passes the DC component of the voltage output from the triboelectric nanogenerator while suppresses the switching frequency and its harmonic components in the output voltage so as to realize the DC buck conversion. The energy of the triboelectric nanogenerator is transferred and transformed by the power management module, and finally a stable DC voltage output is obtained on the load resistor R.

Figure 2A:
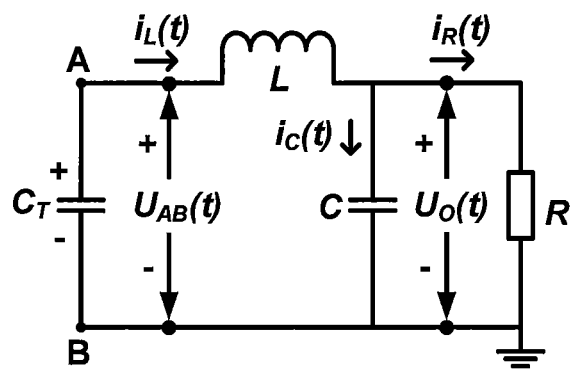
FIGS. 2A and 2B are equivalent circuit diagrams of a power management module of FIG. 1 when the switch circuit is in ON and OFF states respectively.
Figure 2B:
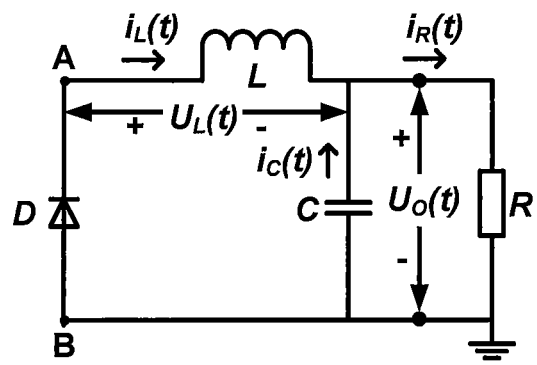

FIGS. 2A and 2B are equivalent circuit diagrams of the power management module of FIG. 1 when the switch circuit is in ON and OFF states respectively. As shown in FIG. 2A, when the voltage of the triboelectric nanogenerator reaches the maximum value, the switch circuit S is switched on, the diode D is in the off state, and the triboelectric nanogenerator may be equivalent to a capacitance $C_T$ full of energy and transfer the energy to the back-end circuit. A part of the energy will be blocked and absorbed by the inductor L, and converted into magnetic field energy and stored in the inductor L, and the other part of the energy will be bypassed to the ground via the capacitor C and stored in the capacitor C in the form of electric field energy. When the voltage across the equivalent capacitance drops to zero, the energy in the triboelectric nanogenerator is fully released, and the switch circuit S is switched off. As shown in FIG. 2B, when the switch circuit S is switched off, the diode D is in an on state, and the current of the inductor L is freewheeled through the diode D, releasing the energy from the inductor L and the capacitor C and supplying power to the load R until the switch circuit S is switched on again. This method may maximize the energy transfer, suppress the AC part in the output signal of the triboelectric nanogenerator, realize the output impedance transformation, and obtain the continuously stable DC voltage output on the load resistance R finally when the circuit reaches a steady state.

Parameters of the capacitor C and inductor L in the LC circuit may be calculated based on the signal characteristics of the voltage output from the triboelectric nanogenerator, $U_0$ and a stable time requirement, according to Kirchhoffs law. An inductance of the inductor L may typically be set to 1-10 mH; and a capacitance of the capacitor C may be set to 1-20 μF.

Figure 3:
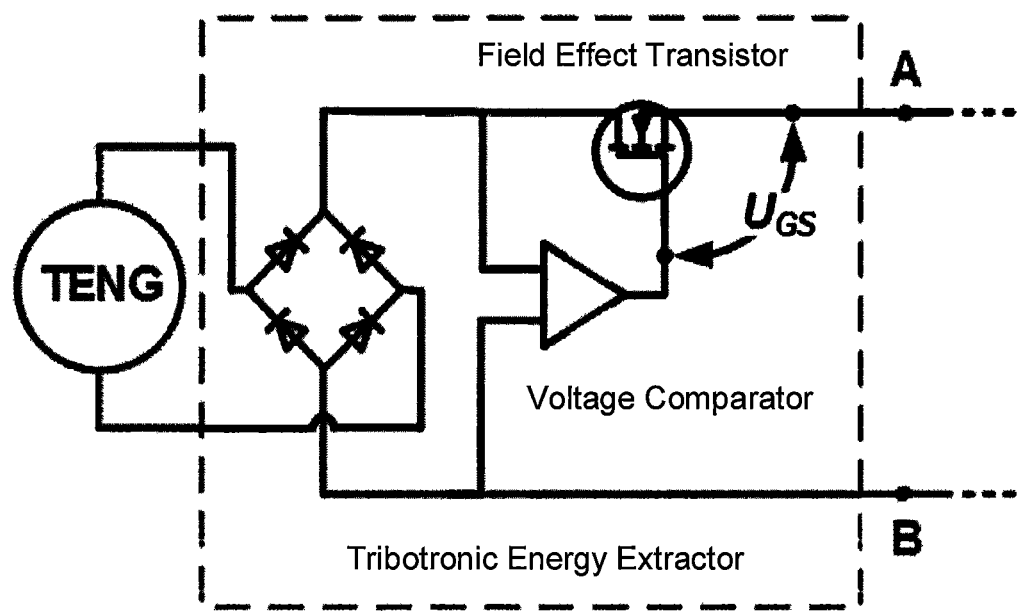
FIG. 3 is a circuit schematic diagram of a triboelectric energy extractor in a power management module for a triboelectric nanogenerator according to an embodiment of the present disclosure.

FIG. 3 is a circuit schematic diagram of a triboelectric energy extractor in a power management module for a triboelectric nanogenerator according to an embodiment of the present disclosure. As shown in FIG. 3, the switch circuit S is an autonomous switch composed of a micro power consumption voltage comparator and a field effect transistor to realize an autonomous switch on/off function in the operating principle. The voltage comparator has input terminals connected to the first output terminal and the second output terminal of the rectifying circuit, respectively, and an output terminal connected to the gate of the field effect transistor; a gate of the field effect transistor acts as a control electrode, one of a drain and a source of the field effect transistor is connected to the first output terminal as an input electrode; and the other of the drain and the source is connected to one of the terminals of the LC circuit as an output electrode. The second output terminal of the rectifying circuit is another output terminal of the switch circuit.

The voltage comparator may enable the autonomous switch to become an autonomous passive switch by connecting a DC power supply or by being power supplied by the triboelectric nanogenerator, so that the entire power management module does not require an external power supply.

After the voltage output from the triboelectric nanogenerator passes through the bridge rectifier, a series of pulsed voltage signals may be obtained, which may be compared with a reference voltage by means of the voltage comparator. When the voltage is lower than the reference voltage, the comparator outputs a low level signal, and the field effect transistor is in an off state; when the voltage is higher than the reference voltage, the comparator outputs an enable signal (control voltage $U_{GS}$) to turn the field effect transistor on. The design for parameters of the voltage comparator and the field effect transistor ensures that the field effect transistor is turned on when the voltage output from the triboelectric nanogenerator is highest, achieving the function of the autonomous electronic switch, so that the maximized energy is transferred from the triboelectric nanogenerator and output to the back-end circuit.

The selection principle of the voltage comparator and the field effect transistor is also based on the signal characteristics of the output voltage and the operating frequency of the triboelectric nanogenerator (TENG), and achieve the effects of lower loss and higher permissible voltage as much as possible. For example, a voltage comparator TLV3401 may be selected; and a field effect transistor FDD3N40 may be selected.

According to another aspect of the embodiments of the present disclosure, a power management method for a triboelectric nanogenerator is also provided, which includes:

rectifying an AC signal generated by the triboelectric nanogenerator to output a first DC signal; and comparing a voltage of the first DC signal with a reference voltage, wherein when the voltage of the first DC signal is higher than the reference voltage, energy generated by the triboelectric nanogenerator is released to an LC circuit, and is subjected to DC buck conversion in the LC circuit, which outputs a second DC signal on a load; and when the voltage of the first DC signal is lower than the reference voltage, the LC circuit outputs a second DC signal on the load through a freewheeling circuit.

The implementation of the power management method for the triboelectric nanogenerator may be referred to that of the power management module, which will not be repeated here.

The reference voltage may be designed according to the device parameters in the circuit, and may be the maximum voltage output from the triboelectric nanogenerator.

The above second DC signal may be used as an output of the energy system for charging an energy storage device or directly driving an electronic device.

Figure 4:
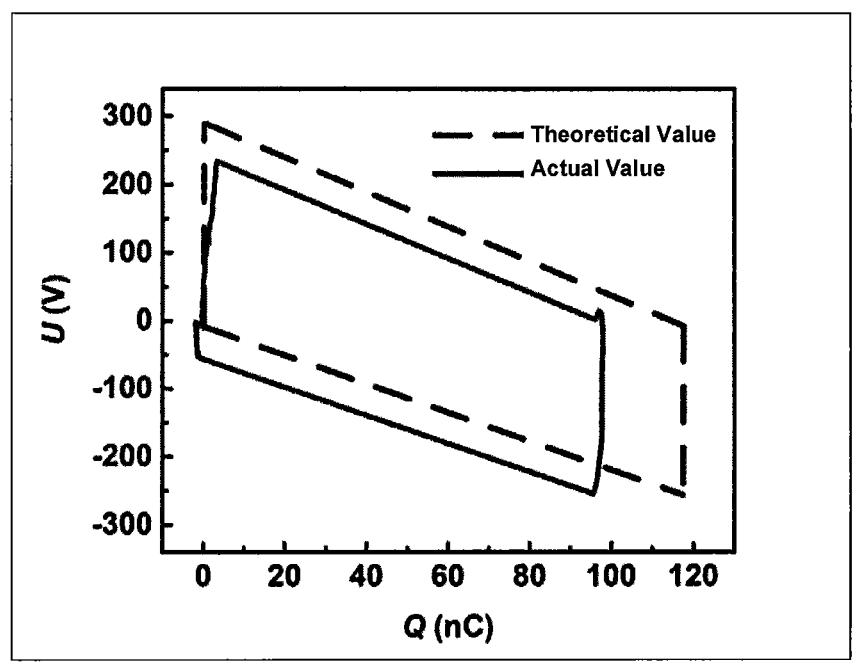
FIG. 4 is a measured graph of a voltage-charge curve during energy transfer of a triboelectric nanogenerator according to an embodiment of the present disclosure.

FIG. 4 is a measured graph of a voltage-charge curve during energy transfer of a triboelectric nanogenerator according to an embodiment of the present disclosure. During the triboelectric nanogenerator performs periodic motion, in the first half period, when the voltage waveform of the triboelectric nanogenerator rises to the maximum positive voltage, the reference voltage of the comparator is reached, the comparator outputs the control voltage to turn the field effect transistor on, the triboelectric nanogenerator releases its accumulated energy to the back-end circuit and its voltage drops rapidly to zero, and the transfer charges rise rapidly. Similarly, in the second half period, when the voltage waveform of the triboelectric nanogenerator reaches the maximum negative voltage, the reference voltage of the comparator is also reached after rectification, so that the comparator outputs the control voltage and turns the field effect transistor on, the triboelectric nanogenerator releases the energy again to the back-end circuit and its voltage resumes to zero quickly, and at the same time, the transfer charges also resume to zero inversely. In this process, the triboelectric energy extractor maximizes the extraction of the energy of the triboelectric nanogenerator and the transfer to the back-end circuit. The area enclosed by the curve in FIG. 4 represents the energy released by the triboelectric nanogenerator. The test result shows that the energy released and transferred by the triboelectric nanogenerator reaches 85% of the theoretical value in one period, which complies with the design and operating principle of the power management module.

Figure 5:
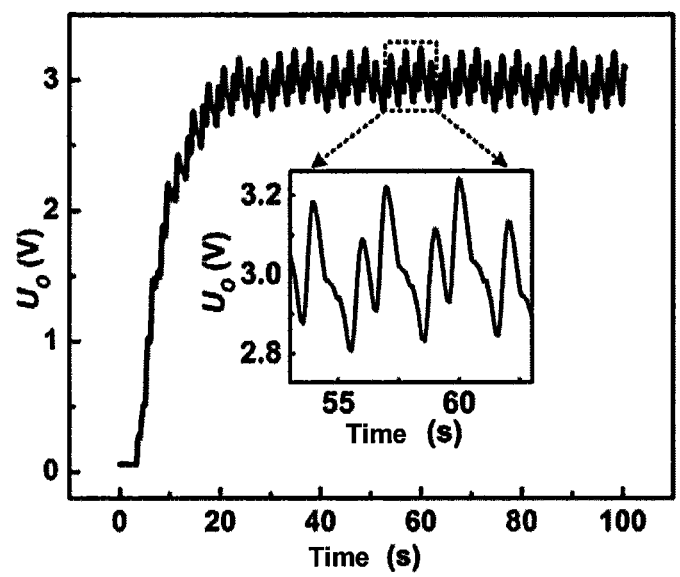
FIG. 5 is a diagram showing a test result of a voltage output from a triboelectric nanogenerator through a power management module according to an embodiment of the present disclosure.

FIG. 5 is a test result of a voltage output from a triboelectric nanogenerator through a power management module according to an embodiment of the present disclosure. As shown in FIG. 5, when the triboelectric nanogenerator has a motion frequency of 1 Hz, the load resistance R is 1 MΩ, the inductance L is 5 mH, and the capacitance is 10 μF, the voltage output from the module continuously rises from the initial state and reaches a steady state after 20 s, where the DC component maintains a 3.0V output with a voltage ripple of 0.4V. Compared with the pulsed voltage waveform directly output from the triboelectric nanogenerator to the resistor, a relatively stable voltage waveform may be obtained on the load resistor by means of the power management module, satisfying the design requirements of the power management module.

Figure 6:
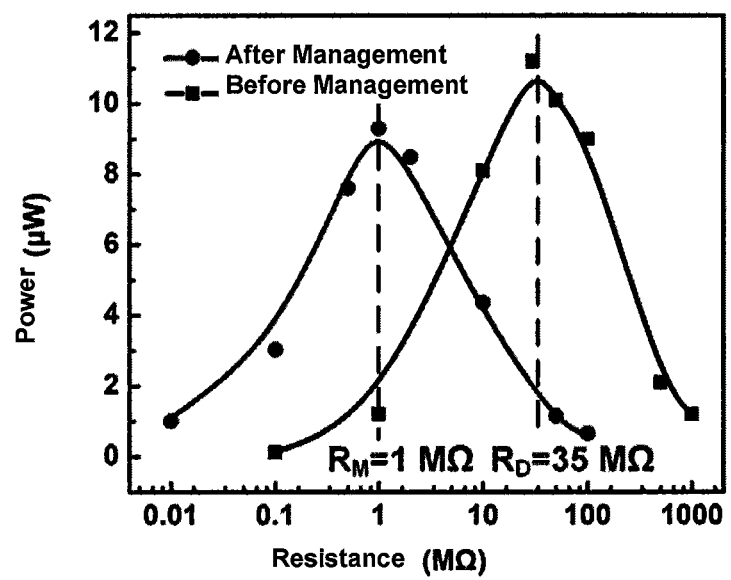
FIG. 6 is a comparison diagram of output power curves of a triboelectric nanogenerator before and after power management according to an embodiment of the present disclosure.

FIG. 6 is a comparison diagram of output power curves of a triboelectric nanogenerator before and after power management according to an embodiment of the present disclosure. As shown in FIG. 6, the output matching impedance ($R_M/R_D$) of the triboelectric nanogenerator, after passing through the management module, is reduced from 35M to 1M, and the maximum output powers are 11.2 μW and 9.0 μW, respectively, which retains 80% of output power while significantly reducing the output impedance.

Figure 7:
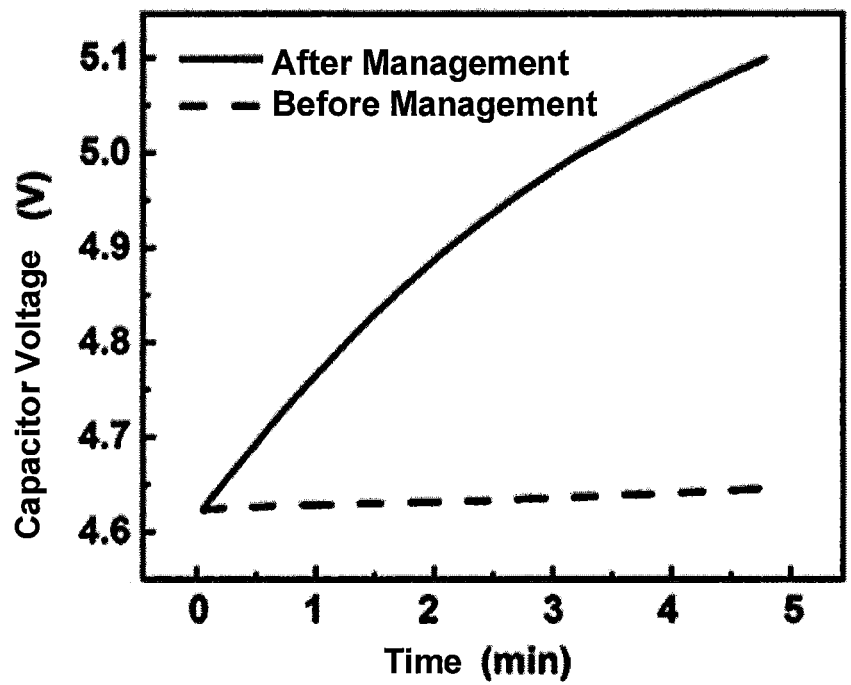
FIG. 7 is a comparison diagram of results of charging a capacitor by a triboelectric nanogenerator before and after power management according to an embodiment of the present disclosure.

FIG. 7 is a comparison of results of charging a capacitor by a triboelectric nanogenerator before and after power management according to an embodiment of the present disclosure. As shown in FIG. 7, the triboelectric nanogenerator directly charges the 1 mF capacitor for 5 minutes at a frequency of 1 Hz, the voltage only rises from 4.632V to 4.636V, and the charged energy is 18.5 μJ; and the same capacitor is continuously charged through the power management module for 5 minutes, the voltage rises from 4.632V to 5.118V, and the charged energy is 2.37 mJ, which is 128 times higher. This verifies the design principle and functional validity of the power management module.

Figure 8:
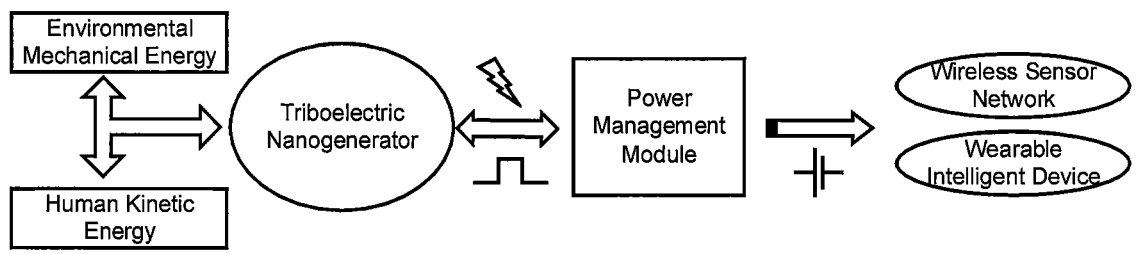
FIG. 8 is a block diagram of a micro-energy collection, management and application system based on a triboelectric nanogenerator and a power management module.

FIG. 8 is a block diagram of a micro-energy collection, management and application system based on a triboelectric nanogenerator and a power management module. As shown in FIG. 8, the different types of triboelectric nanogenerators may be used to collect the human kinetic energy and the mechanical energy in the environment. The power supply may be replaced by the thetriboelectric nanogenerator, by means of the collection and management of the power management module for thetriboelectric nanogenerator, to charge the energy storage device or directly drive various types of electronic devices, which has versatility, efficiency and usability.

In summary, the present disclosure proposes a power management module for the triboelectric nanogenerator, which may maximize and autonomously release the energy of the triboelectric nanogenerator, and obtain a continuous and stable voltage output on the external resistance load through the DC buck conversion. The module may provide power management for a variety of different triboelectric nanogenerators for the collection of the human kinetic energy and the environmental mechanical energy, which has versatility, efficiency and usability, and provides complete micro-energy solutions for the fields of wearable electronics and industrial wireless networks.

The above description is only preferred embodiments of the present disclosure, and is not intended to limit the present disclosure in any way. Any person skilled in the art may make various possible variations and modifications to the technical solutions of the present disclosure by using the methods and technical contents as disclosed above or modify to the equivalent embodiments thereof without departing from the scope of the present disclosure. Therefore, any simple modifications, equivalent variations and modifications of the above embodiments made without departing from the scope of the present disclosure fall into the protection scope of the present disclosure.

We claim:

1. A power management module for a triboelectric nanogenerator, configured to be electrically connected to a back end of the triboelectric nanogenerator, the power management module comprising:
   a rectifying circuit; and
   a Direct Current (DC) buck circuit,
   wherein the rectifying circuit is electrically connected to the back end of the triboelectric nanogenerator and is configured to rectify a signal generated by the triboelectric nanogenerator to output a first DC signal,
   wherein the DC buck circuit is electrically connected to a back end of the rectifying circuit and configured to decrease a voltage of the first DC signal to output a second DC signal,
   wherein the DC buck circuit comprises an LC circuit,
   wherein an inductance of an inductor L in the LC circuit is 1 mH-10 mH, and
   wherein a capacitance of a capacitor C in the LC circuit is 1 μF-20 μF.

2. The power management module of claim 1,
   wherein the rectifying circuit comprises a first output terminal and a second output terminal,
   wherein the DC buck circuit further comprises a switch circuit, wherein the first output terminal of the rectifying circuit is connected to a first terminal of the LC circuit via the switch circuit, and the second output terminal of the rectifying circuit is connected to a second terminal of the LC circuit, and
   wherein both terminals of the capacitor C in the LC circuit are configured as voltage output terminals of the power management module for outputting the second DC signal.

3. The power management module of claim 2, wherein the DC buck circuit further comprises a freewheeling diode connected across the LC circuit for forming a loop with the LC circuit when the switch circuit is disconnected, to release energy of the inductor L in the LC circuit through the loop.

4. The power management module of claim 2,
wherein the switch circuit is an autonomous switch comprising a voltage comparator and a field effect transistor,
wherein the voltage comparator has input terminals respectively connected to the first output terminal of the rectifying circuit and the second output terminal of the rectifying circuit, and has an output terminal connected to a gate of the field effect transistor, and
wherein the gate of the field effect transistor is configured to act as a control electrode, one of a drain and a source of the field effect transistor is connected to the first output terminal of the rectifying circuit as an input electrode, and
wherein another of the drain and the source is connected to one of the terminals of the LC circuit as an output electrode.

5. The power management module of claim 4, wherein the voltage comparator is supplied power by the triboelectric nanogenerator.

6. The power management module of claim 1, wherein the rectifying circuit is a full-wave bridge rectifier.

7. An energy system comprising the triboelectric nanogenerator and the power management module of claim 1,
wherein the second DC signal is an output of the energy system to charge an energy storage device or directly drive an electronic device.

8. A power management method for a triboelectric nanogenerator, comprising:
rectifying an Alternating Current (AC) signal generated by the triboelectric nanogenerator to output a first Direct Current (DC) signal; and
comparing a voltage of the first DC signal with a reference voltage,
wherein when the voltage of the first DC signal is higher than the reference voltage, energy generated by the triboelectric nanogenerator is released to an LC circuit, and is subjected to DC buck conversion in the LC circuit, which outputs a second DC signal on a load,
wherein when the voltage of the first DC signal is lower than the reference voltage, the LC circuit outputs the second DC signal on the load through a freewheeling circuit,
wherein an inductance of an inductor L in the LC circuit is 1 mH-10 mH, and
wherein a capacitance of a capacitor C in the LC circuit is 1 μF-20 μF.

9. The power management method of claim 8, wherein the reference voltage is a maximum voltage output from the triboelectric nanogenerator.

* * * * *